(12) United States Patent
Archer

(10) Patent No.: US 6,197,193 B1
(45) Date of Patent: Mar. 6, 2001

(54) DRINKING WATER FILTER

(76) Inventor: Virgil L. Archer, P.O. Box 4146, Englewood, CO (US) 80155

( * ) Notice: Subject to any disclaimer, the term of this patent is extended or adjusted under 35 U.S.C. 154(b) by 0 days.

(21) Appl. No.: 09/422,810

(22) Filed: Oct. 21, 1999

(51) Int. Cl.$^7$ .................................................. B01D 24/00
(52) U.S. Cl. ......................... 210/266; 210/282; 210/290; 210/502.1; 210/503
(58) Field of Search .................................. 210/660, 688, 210/666, 266, 282, 290, 502.1, 503

(56) References Cited

U.S. PATENT DOCUMENTS

| | | | |
|---|---|---|---|
| 4,615,799 | * | 10/1986 | Mortensen . |
| 5,024,764 | * | 6/1991 | Holler . |
| 5,106,501 | * | 4/1992 | Yang . |
| 5,180,491 | * | 1/1993 | Polasky . |
| 5,205,932 | * | 4/1993 | Soloman ............................ 210/264 |
| 5,275,737 | * | 1/1994 | Heskett ............................. 210/638 |
| 5,378,370 | * | 1/1995 | Brane et al. ...................... 210/678 |
| 5,833,859 | * | 11/1998 | Heskett ............................. 210/638 |
| 6,033,557 | * | 3/2000 | Gebhard . |

* cited by examiner

*Primary Examiner*—Chester T. Barry
(74) *Attorney, Agent, or Firm*—Edwin H. Crabtree; Ramon L. Pizarro; Donald W. Margolis

(57) ABSTRACT

A water filter used for treating tap water. The water filter provides a consumer with protection against major water contaminants found in municipal water supplies. The filter includes a cylindrical filter cartridge with a number of filter layers therein. The filter cartridge includes an upper filter cap and a lower filter cap received in opposite ends of the cartridge. The cartridge includes a plurality of filter pads which may or may not be used as dividers between the various layers of filter material. The filter pads are designed to remove large and small sediments in the water. In an upstream upper portion of the cartridge is layer of a granulated zinc and copper alloy. The zinc and copper alloy is used for removing chlorine and some heavy metals in the water and acting as a bacteriostat for keeping bacteria from growing inside said cartridge. In a center portion of the filter cartridge is a layer of granulated activated carbon. The activated carbon is used for removing chlorine, odor, color and other pollutants. Downstream from the activated carbon is a layer of a granulated ion exchange resin. The resin is used for removing lead. In a downstream bottom portion of the cartridge is a layer of granulated calcite. The calcite is used to raise the water's pH. The last stage of the filter is a one micron absolute depth filter material. This filter material is used for screening out cysts and protozoa.

9 Claims, 1 Drawing Sheet

DRINKING WATER FILTER

BACKGROUND OF THE INVENTION (a) Field of the Invention

This invention relates to water filtration and more particularly, but not by way of limitation, to a water filter used for filtering major water contaminants from tap water from a municipal water supply. The filtered tap water used for drinking, cooking, washing and other household uses.

(b) Discussion of Prior Art

In U.S. Pat. No. 753,780 to Woods, an old time water filter is described wherein a water filter is used with a hand pump for pumping water from a well. The filter includes a series of perforated plates, layers of sand, charcoal and sponges. In U.S. Pat. No. 4,913,808 to Haque, an interchangeable cartridge water purification system is disclosed. The cartridge includes two layers of activated carbon and a layer of anion and cation exchange resins.

In U.S. Pat. No. 5,643,444 to Garrigues et al., U.S. Pat. No. 5,252,206 to Gonzalez, U.S. Pat. No. 4,368,123 to Stanley and U.S. Pat. No. 5,685,981 to Koslow different types of water filters, counter top water conditioners and filtration cartridges are described.

None of the above mentioned prior art water filtering devices disclose or teach the unique features and advantages of the subject drinking water filter used with a tap water supply as described herein.

SUMMARY OF THE INVENTION

In view of the foregoing, it is a primary object of the subject invention to provide an improved water filter used for various household uses. Also, the water filter can be used in commercial and industrial applications where treated drinking, cooking and washing water is desired or required. The water filter provides a consumer with protection against major water contaminants found in municipal water supplies.

Another object of the invention is the water filter removes the contaminants in the water to below E.P.A. recommended minimum levels.

Yet another object of the invention is the water filter is designed to remove large and small sediments in the water. Also, the filter removes chlorine, trihalomethanes, hydrogen sulfide, pesticides, herbicides, toxic heavy metals, (such as lead, organic mercury, organic arsenic and others), cysts, protozoa, (including giardia and cryptosporidium), cancer-causing organic pollutants, micro-organisms and other foreign particles and organisms. The subject invention gives treated water a sparkling clarity by screening material out of the water down to a one micron in size.

Still another object of the invention is the filter is designed to raise the water's pH, thereby lowering acidity and increasing alkalinity, which is recommended by many nutritionists.

A further object of the water filter is no plumbing is required in its use. The water filter is received in a filter housing which is attached to a standard water faucet. The filter housing can be disposed on a counter top for household use. Also, the water filter housing can be attached to a water supply line and mounted under a kitchen sink.

Another object of the invention is the water filter costs pennies per gallon, is compact and space saving in design and eliminates the need to buy, lift and carry heavy water bottles. The water filter has a filter life of treating 1500 gallons of tap water, which is a typical one year average drinking and cooking water use of a family of four. The water filter includes a replaceable filter cartridge which can be quickly and easily replaced.

The filter includes a cylindrical filter cartridge with a number of filter layers therein. The filter cartridge is adapted for receipt in a water filter housing connected to a municipal water supply. The filter cartridge includes an upper filter cap with water inlet in fluid communication with a tap water supply to the filter housing. The upper filter cap is received inside an open top portion of the cartridge. The cartridge also includes a lower filter cap with a water outlet. The lower filter cap is received inside an open bottom portion of the cartridge.

The cartridge further includes a plurality of filter pads which may be used as dividers between different layers of filtration material and along a length of the cartridge. The filter pads are designed to remove large and small sediments in the water from 1 to 100 microns in size and greater when the water is introduced through the cartridge.

In an upstream upper portion of the cartridge is layer of a granulated zinc and copper alloy. The zinc and copper alloy is known in the trade by a brand name of KDF-55. The zinc and copper alloy is used for removing chlorine and some heavy metals in the water. Also, the alloy is an excellent bacteriostat for reducing bacteria in the water.

In a center portion of the filter cartridge is a layer of granulated activated carbon. The activated carbon is used for removing chlorine, odor and color from the water being filtered. Also, the activated carbon removes organic contaminants such as pesticides, herbicides, arsenic, mercury and trihalomethanes, a cancer-causing organic pollutant.

Downstream from the layer of granulated activated carbon is a layer of a granulated ion exchange resin. The ion exchange resin has an exceptional affinity for lead and removes this contaminant to below minimum E.P.A. standards.

In a downstream bottom portion of the cartridge is a layer of granulated calcite. The calcite may be used in the filter to raise the water's pH. This feature lowers the acidity of the water and increases the alkalinity, which many nutritionists recommend.

The last stage of the filter is a one micron absolute depth filter material made of polypropylene or like material. The one micron filter material screens out cysts and protozoa, which includes giardia and cryptosporidium. Also, by filtering the water through the one micron filter material, the water is given a sparkling clarity.

These and other objects of the present invention will become apparent to those familiar with the water filters and water filtration equipment when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawing illustrates complete preferred embodiment of the present invention according to the best modes presently devised for the practical application of the principles thereof, and in which:

DESCRIPTION OF THE PREFERRED EMBODIMENTS

Figure 1:
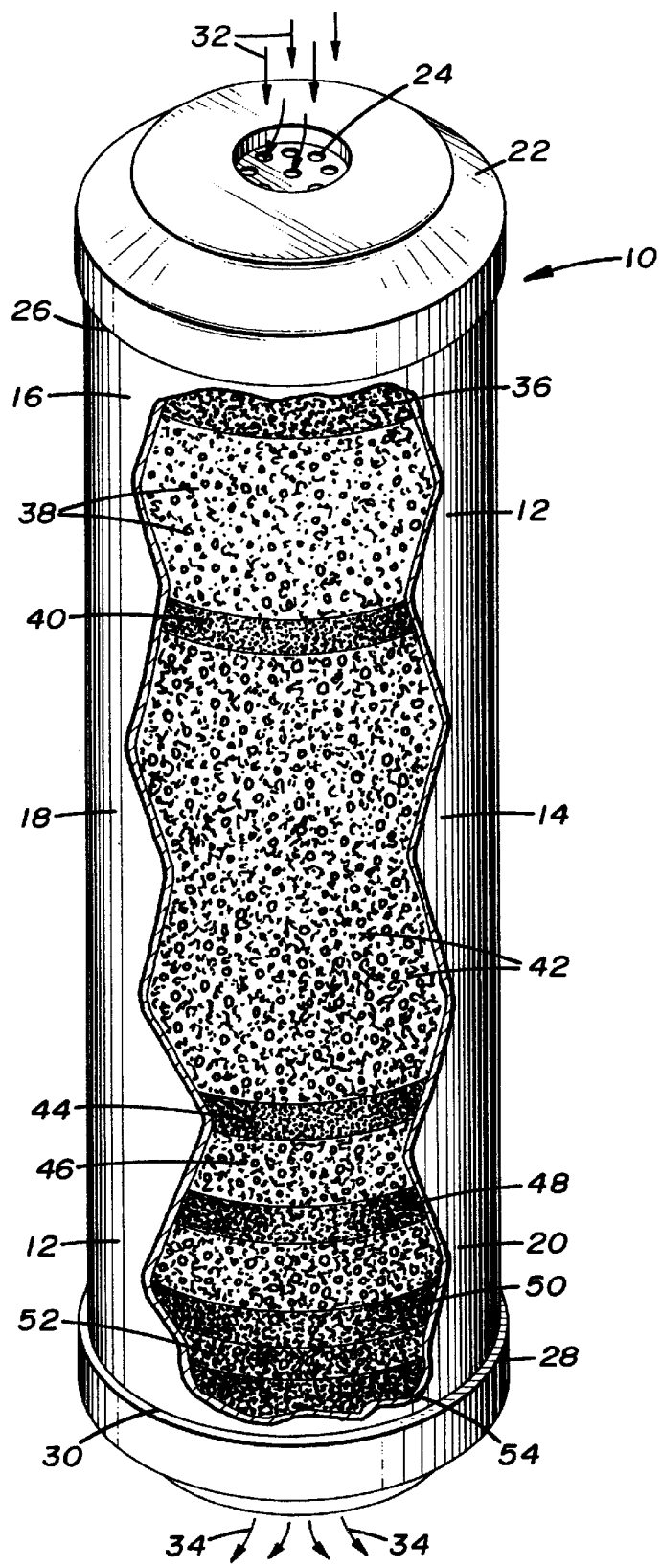
FIG. 1 is a perspective view of the subject water filter with the filter cartridge in an upright position. A portion of a cartridge housing has been cutaway to expose and illustrate the various granular materials used in filtering the water to be treated. Arrows are shown at the top of the cartridge to illustrate the incoming unfiltered water. Also, additional arrows are shown at the bottom of the filter cartridge illustrating discharged treated water.

In FIG. 1, a perspective view of the subject water filter is shown having a general reference numeral 10. The water filter 10 includes a cylindrical hollow filter cartridge 12 shown in an upright position. The cartridge 12 is adapted for receipt inside a filter housing which is connected to a tap water supply line. The filter housing and the water line are not shown in the drawings. The filter housing may be a free standing unit for receipt on top of a kitchen counter top or may be mounted under a kitchen sink or like installation.

The cartridge 12 includes a cartridge housing 14. The cartridge housing 14 includes an upstream upper portion 16, a center portion 18 and a downstream lower portion 20. A portion of the cartridge housing 14 in FIG. 1 has been cutaway to expose and illustrate the various layers of granular materials and filter pads used in filtering the water as it flows therethrough.

Also, the cartridge 12 includes an upper filter cap 22 with a water inlet 24. The water inlet 24 is in fluid communication with the tap water supply line. The upper filter cap 22 is received inside an open top portion 26 of the cartridge housing 14. The cartridge 12 also includes a lower filter cap 28 with a water outlet. The lower filter cap 28 is received inside an open bottom portion 30 of the cartridge housing 14. The water outlet is centered on the lower filter cap 28 and is hidden in this drawing and therefore not shown. In this drawing, arrows 32 are shown at the top of the cartridge 12 to illustrate the incoming unfiltered water from the water supply line. Also additional arrows 34, illustrating the discharged treated water, are shown leaving the water outlet in the lower filter cap 28.

The filter cartridge 12 further includes a plurality of filter pads which may be used as dividers between different layers of filtration material and along a length of the cartridge housing 14. A first filter pad 36 is designed to remove large solids and sediments such as rust. The pad 36 is typically a 100 micron sponge filter but can be in a range of 50 to 150 microns for screening large particles and floating solids in the unfiltered water.

In the upstream upper portion 16 of the cartridge 12 and below the pad 36 is layer of a granulated zinc and copper alloy 38. The zinc and copper alloy 38 is known in the trade by a brand name of KDF-55. The zinc and copper alloy 38 is used for removing chlorine and some heavy metals in the water. Also, the alloy 38 is an excellent bacteriostat for keeping bacteria from growing inside the cartridge 12.

Disposed below the layer of alloy 38 is a second filter pad 40. The second filter pad 40 is typically a 10 micron felt pad for removing smaller floating solids in the water. The pad 40 can be in a range of 5 to 20 microns for screening small particles out of the water.

In the center portion 18 of the cartridge 12 and below the second filter pad 40 is a layer of granulated activated carbon 42. The activated carbon 42 is used for removing chlorine, odor and color from the water being filtered. Also, the activated carbon 42 removes organic contaminants such as pesticides, herbicides, arsenic, mercury and trihalomethanes, a cancer-causing organic pollutant.

Disposed below the layer of activated carbon 42 is a third filter pad 44. The third filter pad 44 is typically a 10 micron felt pad for removing fine sediment in the water. The pad 44, similar to the second pad 40, can be in a range of 5 to 20 microns for screening small and fine particles out of the water.

Downstream from the layer of granulated activated carbon 42 and below the third filter pad 44 is a layer of a granulated ion exchange resin 46. The ion exchange resin 46 has an exceptional affinity for lead and removes this contaminant to below minimum E.P.A. standards.

Disposed below the layer of ion exchange resin 46 is a fourth filter pad 48. The fourth filter pad 44 is typically a 10 micron felt pad for removing fine sediments in the water. The pad 48, similar to the second and third pads 40, 44, can be in a range of 5 to 20 microns for screening additional small and fine particles out of the water.

In the downstream bottom portion 20 of the cartridge 12 is a second layer of granulated activated carbon 42. The second layer of activated carbon 42 provides additional protection in removing chlorine, odor, and cancer-causing organic pollutants from the water.

Disposed below the second layer of activated carbon 42 is a fifth filter pad 50. The fifth filter pad 44 is typically a 10 micron felt pad for removing fine sediment in the water. The pad 48, similar to the other above mentioned felt pads and can be in a range of 5 to 20 microns for screening additional small and fine particles out of the water.

Below the fifth filter pad 44 is a layer of granulated calcite 52. The calcite 52 may be used in the filter 10 to raise the water's pH. This feature lowers the acidity of the water and increases the alkalinity.

The last stage of the water filter 10 is a one micron absolute depth final filter 54. The final filter 54 is made of cellulose or like material. The one micron final filter 54 screens out cysts and protozoa. Also, by filtering the water through the one micron final filter 54, the water is given a sparkling clarity. The final filter 54 is disposed above the lower filter cap 28.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A water filter used for treating tap water from a water supply, the water filter comprising:

a cylindrical hollow filter cartridge having a water inlet and a water outlet at opposite ends of said cartridge, said cartridge adapted for receiving the tap water to be treated therethrough;

a first filter pad, said first filter pad located directly downstream from the water inlet, said first filter used to remove large solids and sediments;

a layer of a granulated zinc and copper alloy received inside said cartridge, said layer of granulated zinc and copper alloy being located directly downstream from said first filter pad, said layer of granulated zinc and copper alloy used for removing chlorine and heavy metals as well as reducing bacteria in the water;

a second filter pad, said second filter pad located directly downstream from said layer of granulated zinc and copper alloy, said second filter pad used for screening out small and fine sediments and particles in the water;

a first layer of granulated activated carbon received inside said cartridge, said first layer of granulated activated carbon located directly downstream from said second filter pad, said first layer of granulated activated carbon used for removing chlorine, odor and color as well as organic contaminants;

a third filter pad, said third filter pad located directly downstream from said first layer of granulated activated carbon, said third filter pad used for screening out small and fine sediments and particles in the water;

a layer of ion exchange resin received inside said cartridge, said layer of ion exchange resin located directly downstream from said third filter pad, said layer of ion exchange resin used for removing lead;

a fourth filter pad, said fourth filter pad located directly downstream from said layer of ion exchange resin, said fourth filter pad used for screening out small and fine sediments and particles in the water; and a layer of granulated calcite received inside said cartridge, said layer of granulated calcite located downstream from said fourth filter pad, said layer of granulated calcite used to increase the water's pH.

2. The water filter as described in claim 1 wherein said first filter pad is used for removing particles in a size range from 50 to 150 microns from the water.

3. The water filter as described in claim 1 wherein said second filter pad is used for removing particles in a size range from 5 to 20 microns from the water.

4. The water filter as described in claim 1 wherein said third filter pad is used for removing particles in a size range from 5 to 20 microns from the water.

5. The water filter as described in claim 1 wherein said fourth filter pad is used for removing particles in a size range from 5 to 20 microns from the water.

6. The water filter as described in claim 1 further including a final filter, said final filter being located between said layer of granulated calcite and the water outlet, said final filter screening out cysts and protozoa.

7. The water filter as described in claim 6 wherein said final filter is used for removing particles in a size range from 1–10 microns from the water.

8. The water filter as described in claim 6 wherein said final filter is made of cellulose.

9. A water filter used for treating tap water from a water supply, the water filter comprising:

a cylindrical hollow filter cartridge having a water inlet and a water outlet at opposite ends of said cartridge, said cartridge adapted for receiving the tap water to be treated therethrough;

a first filter pad, said first filter pad located downstream from the water inlet, said first filter pad used for removing particles in a size range from 50 to 150 microns from the water;

a layer of granulated zinc and copper alloy received inside said cartridge, said layer of granulated zinc and copper alloy located downstream from said first filter pad, said layer of granulated zinc and copper alloy used for removing chlorine and heavy metals as well as reducing bacteria in the water;

a second filter pad, said second filter pad located downstream from said layer of granulated zinc and copper alloy, said second filter pad used for removing particles in a size range from 5 to 20 microns from the water;

a layer of granulated activated carbon received inside said cartridge, said layer of granulated activated carbon located downstream from said second filter pad, said layer of granulated activated carbon used for removing chlorine, odor and color as well as organic contaminants;

a third filter pad, said third filter pad located downstream from said layer of granulated activated carbon, said third filter pad used for removing particles in a size range from 5 to 20 microns from the water;

a layer of ion exchange resin received inside said cartridge, said layer of ion exchange resin located downstream from said third filter pad, said layer of ion exchange resin used for removing lead;

a fourth filter pad, said fourth filter pad located downstream from said layer of ion exchange resin, said fourth filter pad used for removing particles in a size range from 5 to 20 microns from the water;

a layer of granulated calcite received inside said cartridge, said layer of granulated calcite located downstream from said fourth filter pad, said layer of granulated calcite used to increase the water's pH; and a final filter, said final filter being located between said layer of granulated calcite and the water outlet, said final filter used for removing particles in a size range less than 1 micron from the water.

* * * * *